Oct. 30, 1934.  A. P. C. SCHRAMM  1,978,886
MECHANISM FOR CLEANING WINDSHIELDS OR THE LIKE
Original Filed April 12, 1928  3 Sheets-Sheet 1
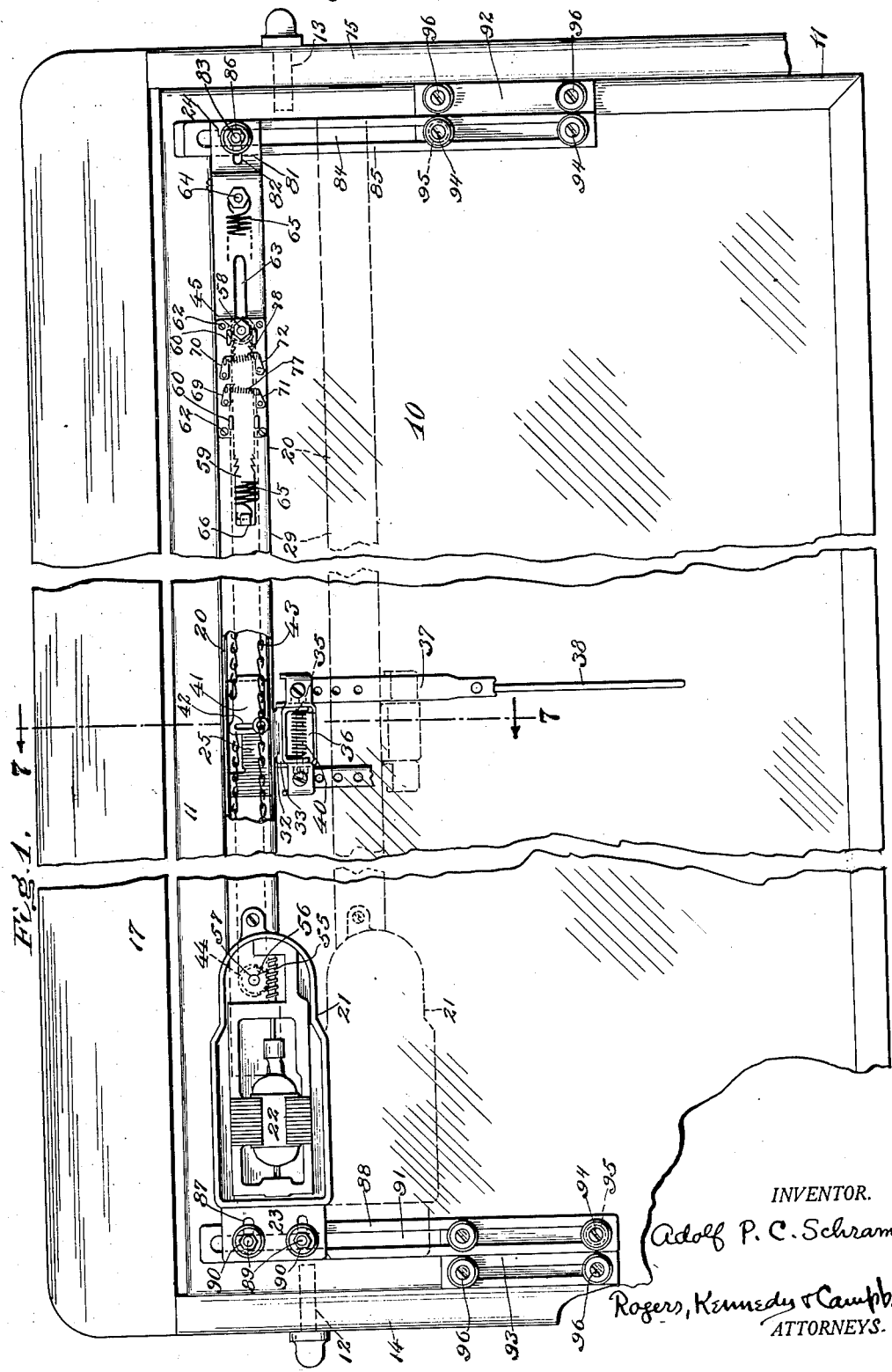
INVENTOR.
Adolf P. C. Schramm
Rogers, Kennedy & Campbell
ATTORNEYS.

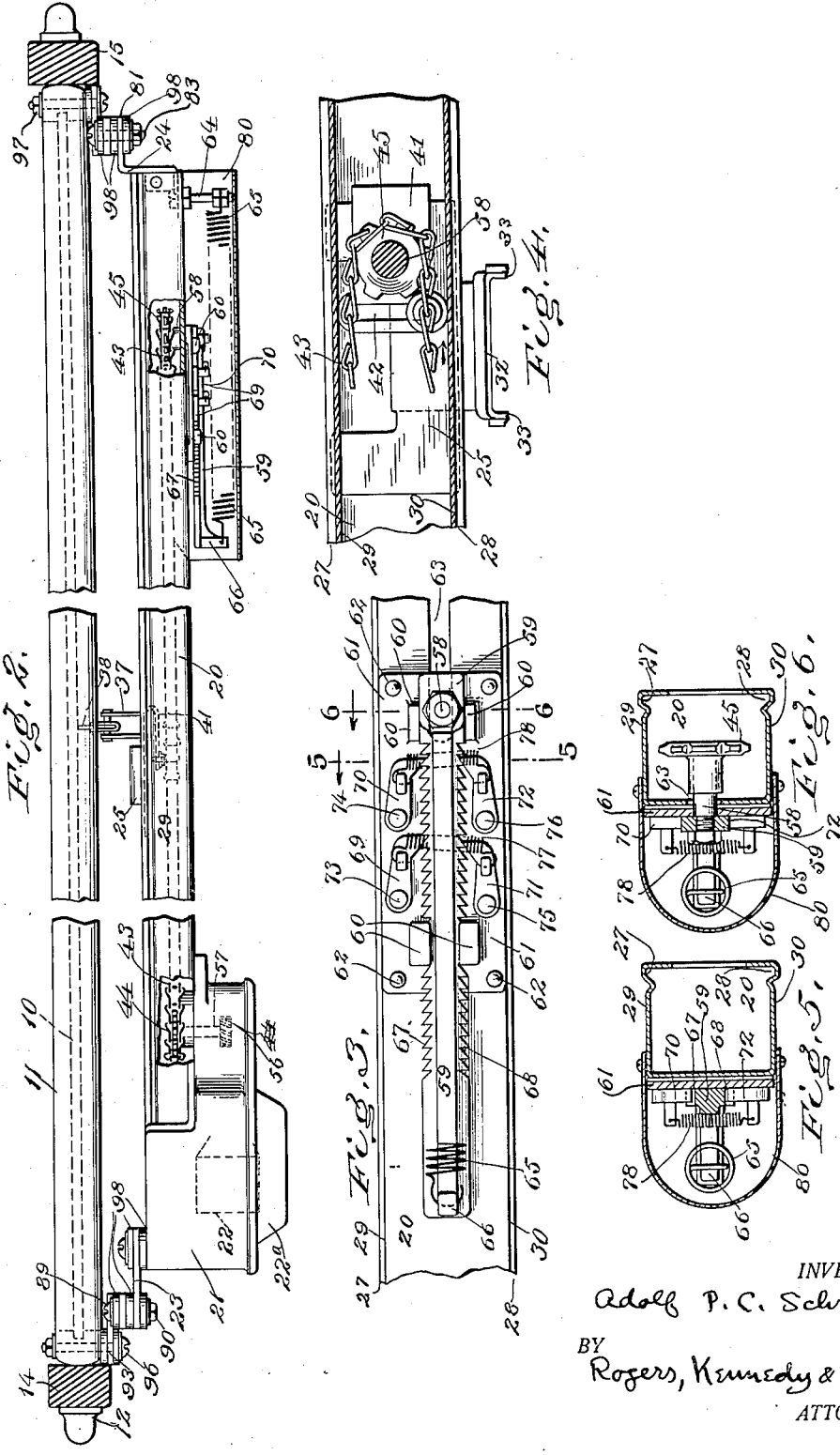

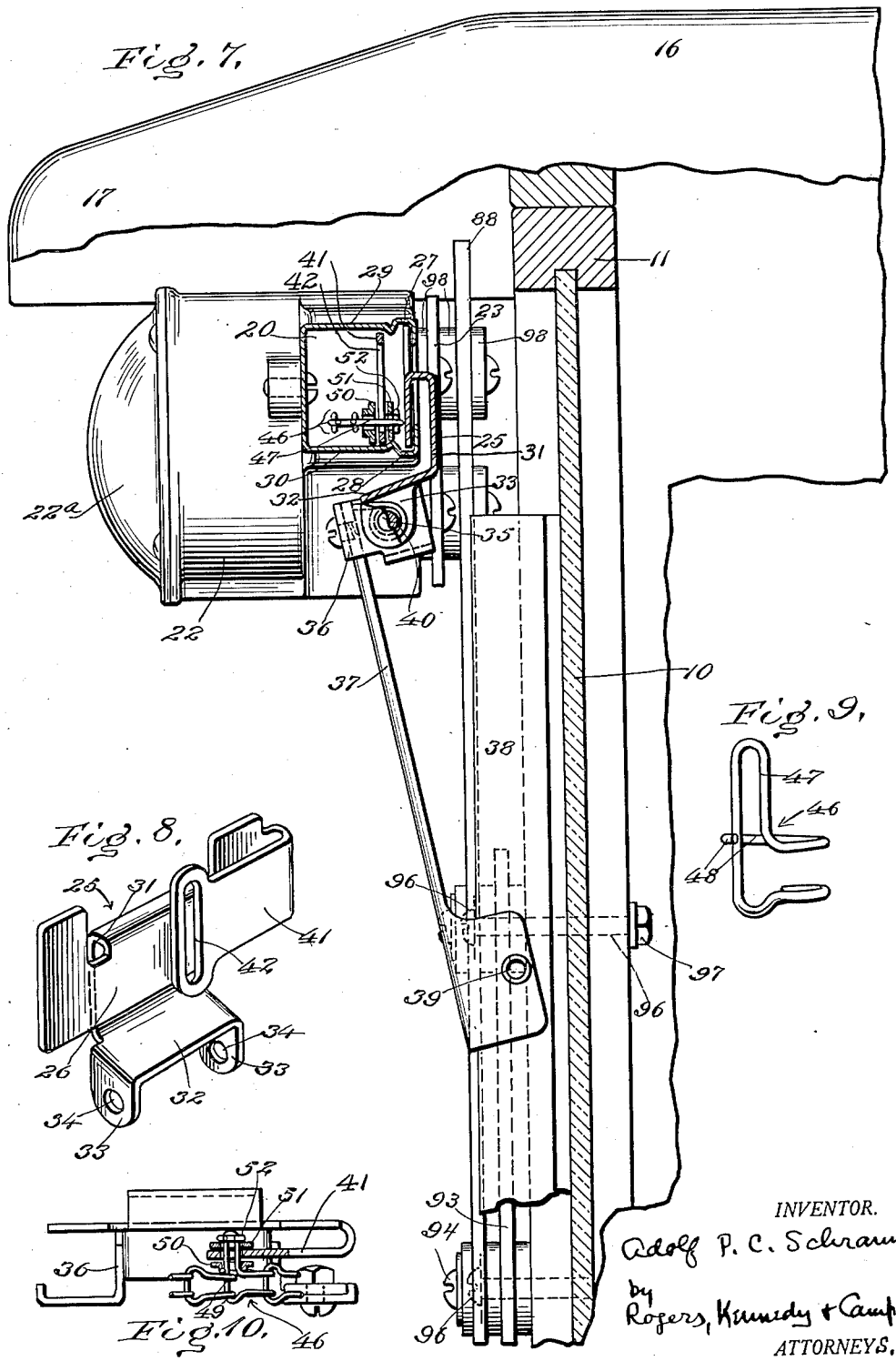

Patented Oct. 30, 1934

1,978,886

UNITED STATES PATENT OFFICE 1,978,886

MECHANISM FOR CLEANING WINDSHIELDS OR THE LIKE

Adolf P. C. Schramm, New York, N. Y., assignor to Storm-King Electric Corporation, a corporation of New York Application April 12, 1928, Serial No. 269,429
Renewed April 2, 1934

2 Claims. (Cl. 74—37)

This invention is an improved mechanism for cleaning windshields or the like, and is shown illustratively applied to mechanically operated wiping mechanism of the type disclosed in U. S. Letters Patent 1,359,797 issued to G. E. and J. W. Doughty on November 23, 1920, although the features of novelty may in some cases be otherwise employed.

The windshield cleaning mechanism of Patent 1,359,797 comprises a guide or support for a reciprocating carriage which travels back and forth above the windshield, carrying with it a flexible or rubber wiper member, motion being imparted to the carriage by means of an endless chain running around and between a pair of spaced sprocket wheels, driven by an electric motor, and the plane of rotation of the sprocket wheels being parallel to that of the windshield, while the carriage is connected to a link of the chain by a connecting bar or link. While this prior mechanism has proven practically successful it is not as efficient or durable as desired; and the general object of the present invention is to afford an improved wiping mechanism, better adapted to modern requirements, efficient and durable.

A particular object of the present invention is to provide means adjusting the distance between the sprockets whereby to compensate for increase in the length of the chain due to stretching or wear; especially a compensating means which will be automatic, thereby reducing attention to adjustment, and preventing noisy operation.

Another object is to provide an improved means for operatively connecting the chain to the carriage.

Still another object is to provide improved means for mounting such windshield wipers whereby to be readily adapted for use on different makes of vehicles, and adjustable for accessibility for purposes of lubrication, cleaning and the like.

A further object is to provide a device with the above enumerated features and which will be simple in construction, strong and rugged in service and silent in operation.

The foregoing and other objects, features and advantages of the invention will be readily apparent from the following description in connection with the accompanying drawings, wherein a preferred embodiment is shown by way of illustration.

Figure 1 is a front elevation of a windshield equipped with the improved automatic wiper, broken away to shorten the drawing, and certain parts being broken away, and parts omitted.

Fig. 2 is a top plan view thereof, similarly broken away.

Fig. 3 is a partial front elevation on a larger scale, showing the automatic slack take-up for the chain.

Fig. 4 is a fragmentary longitudinal sectional view through the chain casing and showing particularly the operative connection between the chain and the carriage.

Fig. 5 is a vertical transverse sectional view on line 5—5 of Fig. 3.

Fig. 6 is a similar view on line 6—6 of Fig. 3.

Fig. 7 is a vertical transverse sectional view looking from the right and taken on the line 7—7 of Fig. 1.

Fig. 8 is a perspective view of the reciprocating carriage detached.

Fig. 9 is a plan view of the master link of the chain, through which connections to the carriage is made.

Fig. 10 is a detail plan view of the carriage, the chain and the connection between them, partly in section.

Referring in detail to the drawings, the improved windshield wiping mechanism has been shown in association with a glass windshield 10 of conventional form, which is mouned in a frame 11 pivotally supported at 12 and 13 upon the front corner posts 14 and 15 of the vehicle body for tilting purposes. The top 16 of the vehicle body overlies said corner posts 14 and 15 and may extend forwardly and downwardly to provide a visor 17.

The main supporting member or frame of the windshield wiping mechanism is shown in the form of a channel or elongated case 20 having its side facing the windshield 10 partly open, and the channel spaced from the glass enough to accommodate the parts to be described; and the case 20 being arranged transversely across the windshield near the upper edge thereof. As best shown in Figs. 1 and 2, the channel or case 20 is connected at its left end to a housing 21 which is fixed on the windshield frame and contains an electric motor 22 for actuating the wiping means, said housing being closed by a cover plate 22ᵃ. The outer or left end of the housing 21 is provided with an extension plate 23, and the opposite end of the case 20 is similarly provided with an angular plate member 24, these plates serving for securing the described elements to the novel mounting means which will later be described.

Mounted for right and left reciprocation in the case 20 is a carriage 25 which is separately shown in Fig. 8, and is preferably formed of sheet metal bent to shape. It comprises a vertical body portion 26, the upper and lower edges of which are adapted to engage and slide in longitudinal guiding grooves 27 and 28 respectively provided in the upper and lower walls 29 and 30 of the case 20. Intermediate its ends, the carriage 25 is provided with an extension bracket 31 which extends rearwardly and downwardly from the body portion 26 and terminates in a forwardly disposed offset 32 below the case 20. This offset 32 is provided at its opposite ends with depending ears 33 which are substantially parallel and are apertured at 34 for the reception of a bolt 35 pivotally supporting the wiping element.

The wiping element comprises a yoke 36 engaged on the bolt 35 secured at the upper end of a wiper arm 37, carrying the cleaning tool 38, such as the usual rubber strip or a scraper, which is pivoted to the arm, as at 39, to allow it to adapt its position to the glass. In order to maintain the cleaning tool 38 in proper engagement with the glass surface of the windshield a torsion spring 40 is shown mounted on the bolt 35, having one of its ends bearing against the offset bracket portion 32 of the carriage and its other end acting upon the yoke of the arm 37 in such a manner as to tend to press the arm and wiper rearwardly against the glass. The yoke 36 is so formed, as seen in Fig. 1, as to permit mounting the wiper arm 37 to either side of the bracket 31, or if desired two such arms may be employed, one at each side, carrying respectively a rubber wiper and an ice scraper.

The carriage 25 is further characterized by a forwardly bent arm 41 disposed in a vertical plane within the case 20, said arm having a vertical slot 42 adjacent its extremity, and substantially central of the length of the carriage, for connection with an endless belt or link chain 43.

The belt or chain 43, while acting to reciprocate the carriage, itself travels continuously in one direction, with its orbit preferably in a plane parallel to that of the windshield. The chain is a sprocket chain and travels over spaced sprocket wheels 44 and 45. The chain links are shown as composed of bent wire, and one of them, herein termed the master link 46, is formed of a single piece of wire bent as best shown in Fig. 9. The master link comprises an integral laterally extending loop 47 for sliding engagement in the slot 42 of the carrier, while one end of the wire is bent across the loop 47 to close and lock with the loop as indicated at 48. By virtue of this arrangement, the link is stiffened and the connecting portions 49 of the adjacent link (Fig. 10) are prevented from sliding upon the loop 47 and so causing disalinement of the chain.

The loop 47 of the master link extends through the carriage slot 42, and preferably washers 50 and 51 are mounted on the loop at opposite sides of the carrier part 41, while a cotter pin 52, or the like, at the extremity of the loop 47, confines the washers and maintains the master link in operative connection with the carrier.

The master link thus travels continuously around the path of the chain, and therefore back and forth across the width of the windshield, and from the preceding description it will be clear that the carriage will reciprocate across and back, and that in one direction of movement the loop 47 of the master link will be at the lower end of the slot 42, and when traveling in the other direction the loop will be at the upper end of said slot, working from one end to the other when passing around the sprocket wheels.

Power is supplied by the motor 22 to drive the sprocket chain 43, by means of a worm 55 on the motor shaft meshing with a worm gear 56 on a shaft 57 on which is carried the sprocket 44 engaged by the chain. The other sprocket 45 is an idler, rotating only as it is actuated through the chain.

In order to permit take up of slack in the chain, namely by increasing the center distance between the sprockets, the idler sprocket 45 is journaled upon a shaft or stud 58 which is mounted in a longitudinally adjustable support or slide bar 59, with which an automatic take-up mechanism is associated. The support 59 is illustrated as in the form of an elongated slide or bar which is guided for rectilinear motion between guide lugs 60 outstanding from a plate 61, fixedly secured to the front wall of the case 20 by rivets 62. Said front wall is provided with a longitudinal slot 63 to accommodate the shaft 58. Adjacent the right end of said wall a post 64 extends forwardly for the anchorage of one end of a tension spring 65. The other end of this spring 65 is secured to a lug or boss 66 on the left end of the bar 59. The arrangement is such that the tension of this spring tends to draw the bar, together with shaft 58 and idler sprocket 45, in a rightward direction or away from the driving sprocket 44, thus lengthening the between center distance and taking up any slack due to stretch and wear.

The idler sprocket wheel 45 is anchored in each successive taken up position, for example as follows. The upper and lower edges of the slide bar 59 are provided with ratchet teeth 67 and 68, as best shown in Fig. 3, thus constituting a double rack. Cooperating with said ratchet teeth to lock and prevent reverse or left movement of the bar and sprocket, are a plurality of dogs or pawls 69 and 70 at the upper side and 71 and 72 at the lower side. The pawls 69 to 72 are pivoted respectively at 73, 74, 75 and 76 on the mounting plate 61, and pulled toward each other by springs 77 and 78 whereby to be held in engagement with the ratchet teeth. The arrangement of the pawls is such that they successively function in a differential manner, being timed successively with respect to the teeth, so that the slack on the chain 43 will at all times be less than one-fourth of the length of a single ratchet tooth, and as soon as stretching or wear results in an amount of slack as great as that, the spring 65 will have pulled the bar 59 a corresponding amount, bringing another pawl and tooth into holding engagement. At the same time the structure is rugged and durable, as each tooth is of ample dimension, and each pawl engages squarely with the teeth.

A supplemental sheet metal housing or cover 80 is shown to encase the take-up mechanism, said cover being held frictionally or otherwise to the upper and lower walls 29 and 30 of the case 20. The cover 80 is shown in Figs. 2, 5 and 6, but has been omitted from the remaining figures.

Another feature of invention resides in the effective and simple means of mounting the cleaner mechanism upon the windshield, as shown in Figs. 1 and 2, whereby to readily adapt the mechanism to use upon different makes of vehicles, and to facilitate adjustment, inspection, oiling or repairing without interference with or inconvenience from surrounding parts, for example the visor 17. For these purposes the mounting plate 24 at the right end of the case 20 has a laterally extending portion 81 disposed in substantially the same plane as the extension plate 23, parallel to the windshield. The plate portion 81 has a horizontal slot 82 accommodating a bolt or screw 83, which extends also through a vertical slot 84 in a fixed upright bracket plate 85 at the right side edge of the windshield. The bolt is provided at one end with a nut 86 for rigidly clamping the leg member 24 to the bracket, when adjusted.

For similar purposes the extension plate 23 at the left has two short horizontal slots 87 through which plate is connected to an upright bracket plate 88 by screws 89 and nuts 90. The bracket 88 is like bracket 85 in structure and size and has a long vertical slot 91 through which the screws 89 pass. It will be observed that these two brackets extend vertically between the ends of the case 20 and their attachment points to the windshield frame. Adjacent their lower ends, each of the brackets 85 and 88 is adjustably clamped to fixed supporting plates 92 and 93 respectively by means of bolts 94 and nuts 95, said plates extending over the side members of the windshield frame 11, and being secured thereto by screws 96 and nuts 97. In order to prevent creaking noises washers 98 of rubber or rubberized fabric, are shown clamped between the connected portions of the plates 23, 81, 85, 88, 92 and 93.

The mounting of the cleaning mechanism is thus universally adjustable. The upright brackets 85 and 88 are adjustable vertically with reference to the plates 92 and 93 and windshield, while the case 20 is adjustable both up and down and laterally with reference to said upright plates 85 and 88. In mounting the mechanism on the windshield, it is only necessary to drill four holes to accommodate the screws 96, and after the plates 92 and 93 have been secured in place, the case 20 and upright plates 85 and 88 can be applied as a unit. When the vehicle is equipped with a visor, the mechanism, which otherwise would be difficult of access, can be very conveniently inspected and lubricated by merely loosening the four lower nuts 95 and lowering the assembly, as indicated by the dotted lines in Fig. 1, and without dismounting any part of the wiper mechanism, nor the visor.

The operation of the invention has been largely explained in the foregoing description, but will be briefly recapitulated. When it is desired to have the windshield wiper operate, the driver of the vehicle throws any control switch to furnish current to the motor 22; for which another source of power can be substituted. Through the worm 55 and worm gear 56, the sprocket wheel 44 is driven, and this imparts constant motion to the belt or chain 43. Through the master link 46, the carriage 25 is caused to travel first right and then left across the windshield 10, between the positions of the sprockets 44 and 45, and it carries with it the yoke 36, arm 37, and cleaning tool 38. The tension spring 65 exerts constant pull upon the slidable bar or support 59 of the idler sprocket to take up any slack in the chain 43, while back lash is prevented by one of the pawls 69, 70, 71 or 72 solidly engaging a tooth on the bar 59. If the chain should stretch or wear and cause more than the normal amount of slack the spring 65 promptly moves the bar 59 along until another tooth is engaged. The take-up is step-by-step so that said pawls function successively, and by thus reducing slack to a minimum, the chain is prevented from jumping off the sprockets, while noise and wear are substantially eliminated.

The entire action is rendered more steady and stable, and thus more effective and permanent. The construction is simple, and is strong and durable in service, efficient in operation, and capable of being economically manufactured.

An important advantage of the present invention is the prevention of the looseness which would otherwise occur to the elongation of the sprocket chain, such elongation tending to destroy the tension on the chain which is necessary for proper sprocket operation and tending to allow partial disengagement of the links from the sprockets, resulting in binding of the links, strain on the chain, noise and eventual breakage. It will be understood that the tension spring is strong enough to keep the chain under constant tension to prevent these drawbacks and at the same time to prevent swaying of the chain and objections thereto. The purpose of the double rack and pawls is to prevent the back pull which tends to slacken the chain during that part of the operation when the carriage is being drawn toward the idler sprocket. By reason of these features the windshield cleaner can be operated at greater speed which in turn results in a cleaner windshield and less strain on the mechanism. The type of master link by which the chain operates the wiper carriage is of advantage in its simplicity and integral construction with the chain, this prevents the wearing of flat sides which tend to wear on a round or pin connection. The master link has no attached metal parts nor any riveting so that there is nothing to loosen and no skill is required in assembling or mounting the apparatus.

The hooking of the end of the master link while over the loop portion of the link renders the link extremely rigid and unstretchable. The described means of mounting the cleaning mechanism on the windshield is of great practical advantage in the ease of applying it to various windshields. There is no necessity of dismounting any parts of the windshield for the attaching of the cleaning mechanism thereto. When in place the cleaning mechanism can be lowered for the purpose of opening the windshield, without conflict with the visor; and this can be done either by lowering the brackets 88 and 95 on the mounting plates 92 and 93, or simply by loosening the connections between the top end of the brackets and the ends of the tubular frame or case, thus lowering the cleaning mechanism relatively to the brackets.

Manifestly the invention is susceptible of numerous modifications in the details of construction and arrangement of parts, and the right is herein reserved to make such changes as fall within the scope of the appended claims without departing from the spirit of the invention.

What is claimed is:

1. In apparatus of the class and for the purpose set forth, having a continuously driven endless chain with two sprockets around which it travels, and a carriage movable longitudinally back and forth by connection from the continuously moving chain, the combination of said chain, the same having a master link with a lateral projection at right angles to the plane of chain travel, and said carriage, the same formed with a transverse slot parallel to the plane of chain travel but at right angles to the longitudinal length of the chain, the said link projection engaging and running in the carriage slot, a longitudinally shiftable support for one of the end wheels, a resilient device applying constant longitudinal thrust upon said support tending to shift such wheel away from the other end wheel, and lock means preventing movement of the support and first end wheel toward the other end wheel; the master link consisting of a wire bent into a cross bar and pivot loops engaging respectively the pivot loops and cross bar of the adjacent links, and the cross bar of the master link being extended laterally out of the plane of chain travel to constitute the lateral projection engaging the slot of the carriage.

2. In apparatus of the class set forth, having an endless chain with two sprockets around which it travels, and a carriage movable longitudinally back and forth by connection from the chain, the combination of said chain, the same having a master link with a lateral projection at right angles to the plane of chain travel, and said carriage, the same formed with a transverse recess parallel to the plane of chain travel but at right angles to the longitudinal length of the chain, the said master link projection engaging and running in the carriage recess, a longitudinally shiftable support for one of the end wheels, and means for shifting and locking such support to take up slack in the chain; the master link consisting of metal shaped to have a cross bar and pivot loops engaging respectively the pivot loop and cross bar of the adjacent links, and the cross bar of the master link having a lateral extension out of the plane of chain travel constituting the said lateral projection engaging the transverse recess of the carriage.

ADOLF P. C. SCHRAMM.